United States Patent
Chan et al.

(10) Patent No.: US 10,154,716 B2
(45) Date of Patent: Dec. 18, 2018

(54) CAMERA CASE REMOVABLE CAMERA LENS HOLDER

(71) Applicants: Ronald Chi-yin Chan, Coquitlam (CA); Yau Sing Hubert Sin, Coquitlam (CA); Brian Hiyin Lee, Delta (CA)

(72) Inventors: Ronald Chi-yin Chan, Coquitlam (CA); Yau Sing Hubert Sin, Coquitlam (CA); Brian Hiyin Lee, Delta (CA)

( * ) Notice: Subject to any disclaimer, the term of this patent is extended or adjusted under 35 U.S.C. 154(b) by 95 days.

(21) Appl. No.: 15/130,750

(22) Filed: Apr. 15, 2016

(65) Prior Publication Data
US 2017/0295901 A1    Oct. 19, 2017

(51) Int. Cl.
| | |
|---|---|
| G02B 7/02 | (2006.01) |
| A45C 13/02 | (2006.01) |
| A45C 11/38 | (2006.01) |
| G03B 11/04 | (2006.01) |
| G03B 17/56 | (2006.01) |
| G03B 17/14 | (2006.01) |

(52) U.S. Cl.
CPC ............. *A45C 13/02* (2013.01); *A45C 11/38* (2013.01); *G03B 11/041* (2013.01); *G03B 17/56* (2013.01); *G03B 17/14* (2013.01)

(58) Field of Classification Search
CPC .... G03B 17/561; G03B 17/565; G03B 17/56; G03B 17/563; G03B 37/02; G03B 17/566; G03B 17/568; G03B 13/20; G03B 17/02; G03B 17/14; G03B 21/32; G03B 2206/00; G03B 11/00; G03B 15/003; G03B 15/08; G03B 15/12; G03B 17/08; G03B 17/12; G03B 19/04; G02B 13/001; G02B 15/10; G02B 7/021; G02B 7/14; G02B 23/14; G02B 23/16

USPC .......................... 359/808, 811, 815, 819–824
See application file for complete search history.

(56) References Cited

U.S. PATENT DOCUMENTS

| | | | |
|---|---|---|---|
| 4,210,186 A * | 7/1980 | Belenson | A45C 3/00 190/110 |
| 2011/0229121 A1* | 9/2011 | Kimball | G03B 17/566 396/661 |

FOREIGN PATENT DOCUMENTS

CN         203676378         7/2014

OTHER PUBLICATIONS

NIKON camera case (picture incuded) https://c2.staticflickr.com/8/7062/6988329563_ab438e8d4_b.jpg.

* cited by examiner

*Primary Examiner* — Brandi Thomas
(74) *Attorney, Agent, or Firm* — Dean A. Craine, PS

(57) ABSTRACT

A camera lens holder comprising a cylindrical body formed or attached to a perpendicularly aligned planar base. The cylindrical body has a cylindrical cavity with a top opening with a chamfered inside edge. The diameter and length of the cylindrical cavity to receive and hold the bayonet-style end connector on a camera lens. Formed on the inside surface of the cylindrical body are lugs configured to engage the bayonet-style end connector on the lens. Formed on the outside surface of the cylindrical body are two or more projecting wings. Attached to the bottom surface of the planar body is a hook connector pad configured to connect to the inside surface of a camera bag made of cotton, nylon or felt material. The chamfered inside edge on the cylindrical body allows easy insertion of the bayonet-style end connector on the lens without precisely aligning the lens over the top opening.

5 Claims, 4 Drawing Sheets

CAMERA CASE REMOVABLE CAMERA LENS HOLDER

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention:

This invention relates to camera lens holders that are removably attached to different interior surfaces inside a camera case.

2. Description of the Related Art:

Single lens reflex (SLR) cameras use interchangeable lenses. Each lens has a cylindrical body with a glass lens on one end and a proprietary bayonet-style end connector at the opposite end that attaches to a compatible bayonet-style lens mount on the front of a camera. Plastic lens caps are placed over the glass lens to protect the lens and prevent dust deposits.

Leather or vinyl covered camera bags are sold in different sizes to hold different camera bodies with or without a lens attached thereto, various camera accessories, and one or more replacement lenses. Most camera bags include adjustable partitions that extend across the main cavity inside the camera bag to create different, isolated storage areas for holding a camera body, accessories, or lenses. The inside of the camera bag, the bottom panel, sidewalls, end walls and lid are usually covered with soft fabric such as terry cloth or felt.

Amateur and professional photographers often carry different lenses in their camera bags they can quickly exchange with a lens attached to the camera body. The detached lenses are spaced apart and placed in one of the different storage areas created by flexible, adjustable partitions that connect at its opposite ends to the camera bags interior walls covered with hook or loop material and that extends longitudinally or transversely inside the camera bag's main storage space.

When a photographer wants to exchange the lens, he will hold the camera body in one hand and grasp the old lens with the opposite hand and remove it from the camera body. A rear lens cap is attached to the old lens that is then deposited into an open storage area inside the camera bag. The new lens is grasped, removed from the camera bag and attached to the camera body. Ideally, an open storage area is needed inside the camera bag for depositing the old lens. Also, the new lens should be stored in a visible, unobstructed location inside the camera bag so it may be easily grasped.

What is needed is a removable camera lens holder that engages the bayonet-style end connector on a camera lens that temporarily holds and protects the lens in a temporary fixed location to inside a camera bag that may or may not have hook or loop material on its interior.

SUMMARY OF THE INVENTION

Disclosed is a camera lens holder that addresses the problem of temporarily holding and protecting a camera lens in different fixed positions inside a camera case. The camera lens holder comprises a cylindrical body formed or attached to a perpendicularly aligned planar base. The cylindrical body has a relatively low profile with a circular sidewall surrounding a coaxially aligned cylindrical cavity with a top opening. The upper edge of the sidewall is self-aligning that allows a lens to be easily aligned and inserted into the cylindrical cavity. The diameter and length of the cylindrical body are sufficient to temporarily receive and hold the bayonet style end connector on a camera lens when coaxially aligned and inserted into the cylindrical cavity.

Formed on the inside surface of the cylindrical body are inward projecting lugs configured to engage the outward projecting, complimentary-shaped lugs formed on the bayonet-style end connector on a lens. The number of, shape, size and relative location of the lugs used on the cylindrical body varies depending on the style, size and locations of the lugs formed on the lens. During use, the lugs on the lens and the lugs on the cylindrical body are configured to so that when the lens is properly aligned over the lens holder, the two sets of lugs may be interconnected and engaged by rotating the lens 30 to 90 degrees over the cylindrical body.

Formed on the outside surface of the cylindrical body are two or more outward protruding wings that the user may grasp to hold the cylindrical body in a fixed position when the lens is rotated when inserting or removing lens from the holder. In one embodiment, the wings are triangular in shape so the apex of the wing is aligned opposite the entrance opening to an inward projecting lug formed on the cylindrical body. Most lens include a raised or color dot on the exterior surface of the lens. During use, the photographer can determine if the lens is properly aligned of the camera lens over the holder's lugs by feeling the apex of at least one wing and aligning the dot over the apex. When properly aligned, the lens is pushed into the lens holder and rotated. The wings also act as gripping surfaces for holding the lens holder when locking or unlocking the lens from the lens holder. In one embodiment, the top surface of each wing is beveled downward to accommodate a gasket attached to the bayonet-style end connector on a lens when the lens is inserted into the lens holder.

Because the top edge of the holder may be obscured or difficult to see inside a camera bag, the top edge of the cylindrical body may be beveled and self-aligning so that the bayonet-style end connector on the end of a lens is coaxially aligned over the cylindrical body's top opening.

Attached to the bottom surface of the planar base is a hook connector pad configured to connect to the inside surface of a camera bag or lid made of cotton, nylon or felt material. In one embodiment, the hook connector pad is adhesively attached to the planar base. If the inside surface of the camera bag is covered with cotton, nylon, or terry cloth or covered by a large loop connector pad used to attach a partition inside bag, the hook connector pad may attach to the inside surface of the bag or lid. In one embodiment, the holder is distributed with an adhesively attached loop connector pad that the user may attach to the inside surface of the bag or lid.

DESCRIPTION OF THE PREFERRED EMBODIMENT(S)

Figure 1:
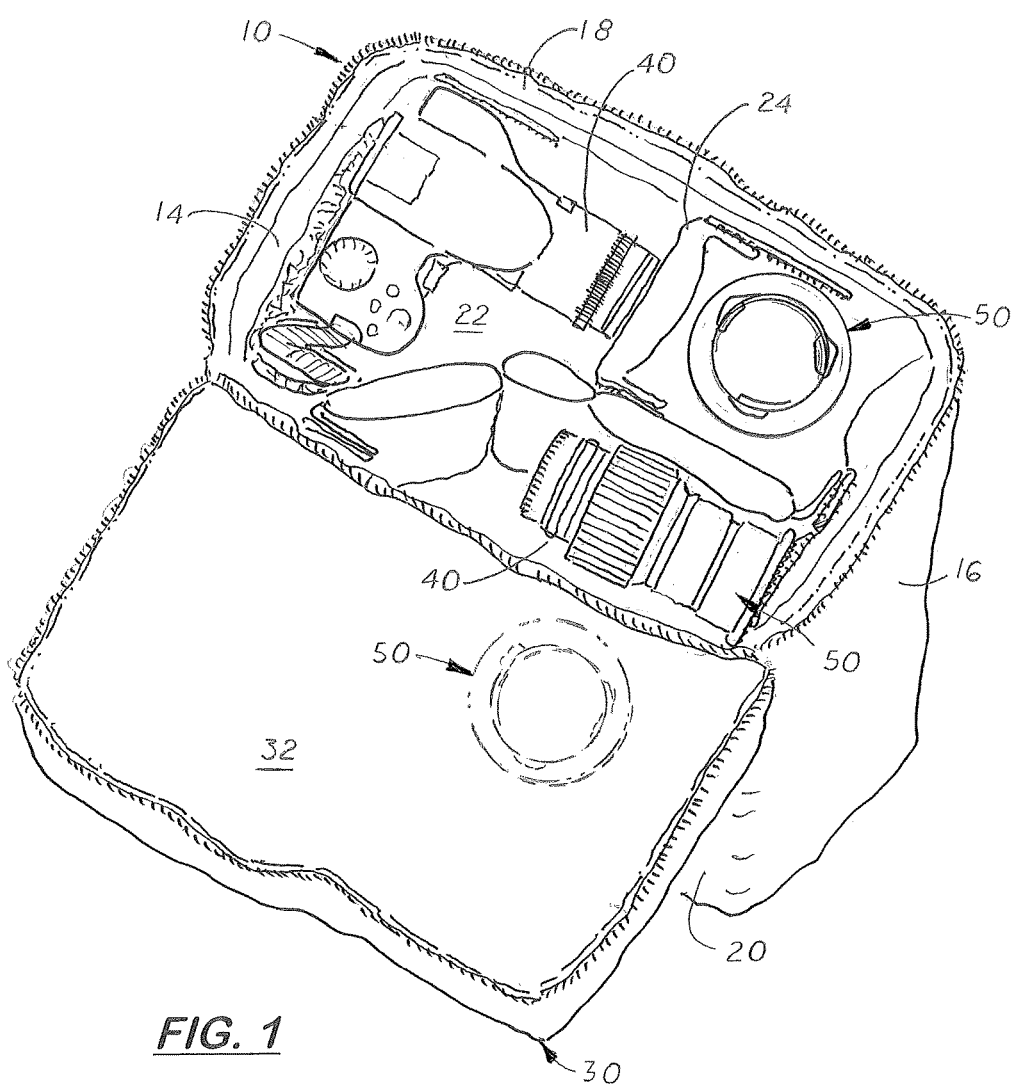
FIG. 1 is a perspective view of a camera bag containing a camera with a lens attached to the camera body, a separate lens attached to a lens holder attached to the inside surface of the camera bag's vertical end wall, and a second lens holder attached to the inside surface of the bottom panel, and showing the second lens holder optionally attached to the inside surface of the camera lid.
Figure 2:
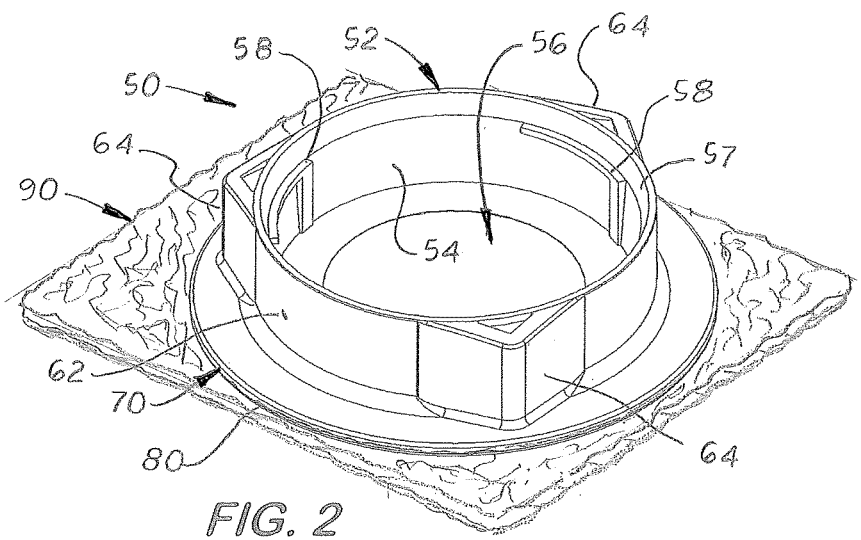
FIG. 2 is a perspective view of a lens holder attached to a compatible support surface.
Figure 3:
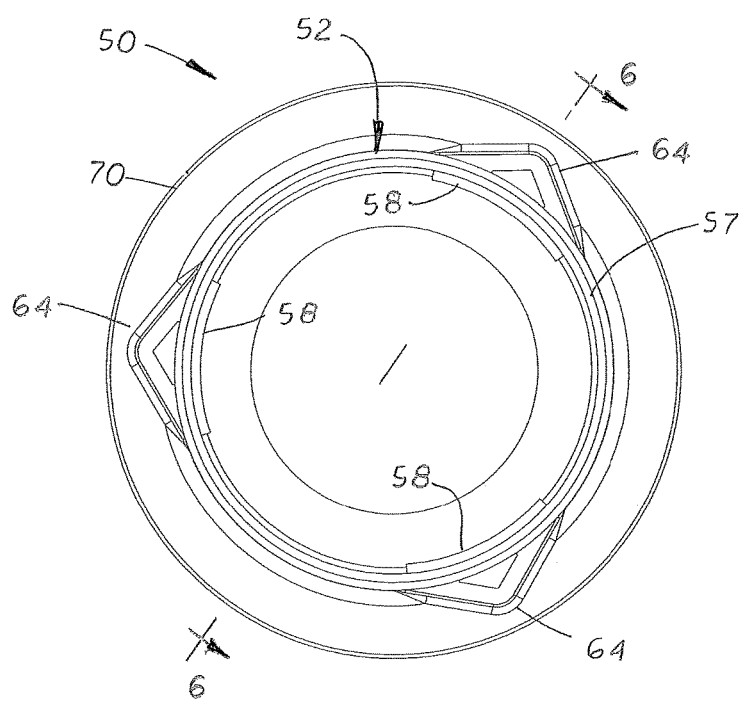
FIG. 3 is a top plan view of the lens holder shown in FIG. 2.
Figure 4:
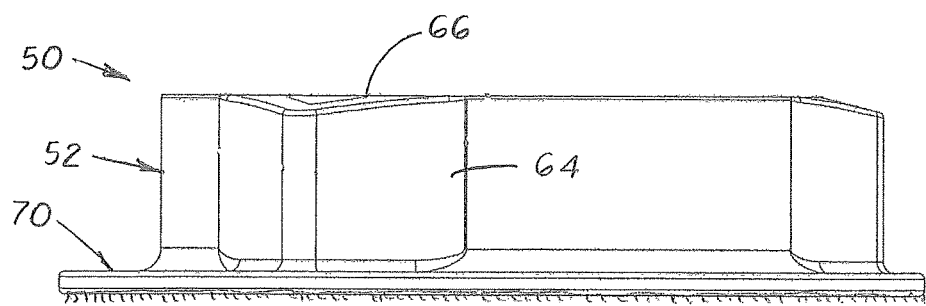
FIG. 4 is a side elevational view of a lens holder.
Figure 5:
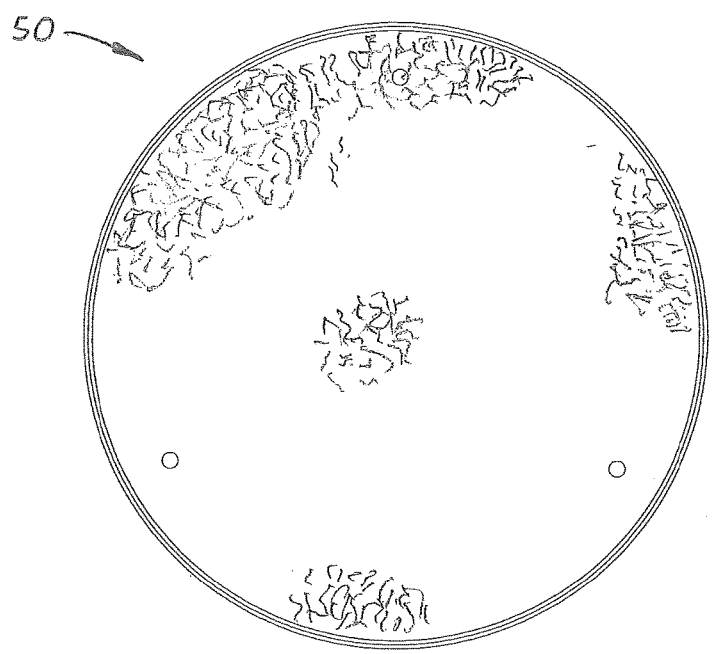
FIG. 5 is a bottom plan view of a lens holder.
Figure 7:
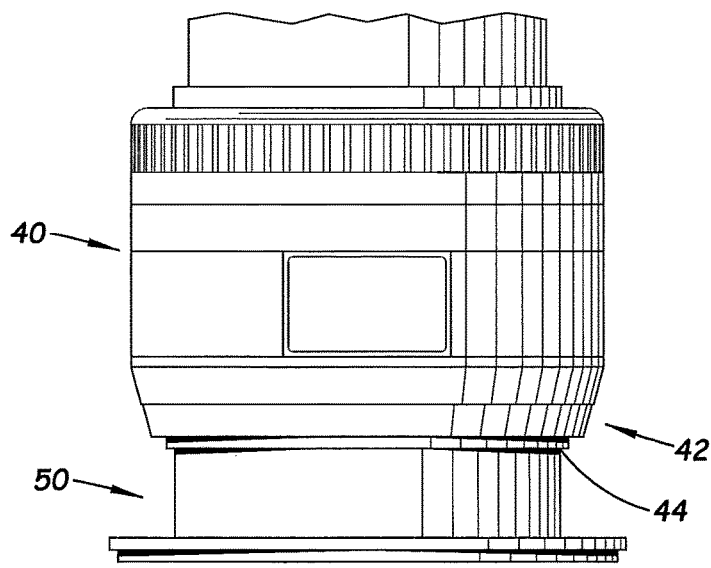
FIG. 7 is a side elevational view of a lens attached to the lens holder.

Referring to FIGS. 2-4, there is shown a camera lens holder 50 comprising a cylindrical body 52 formed or attached to a perpendicularly aligned planar base 70. The cylindrical body 52 has a curved sidewall 54 and coaxially aligned cylindrical cavity 56 with an upper chamfered top edge 57. The diameter of the cylindrical cavity 56 and the length of the sidewall 54 are sufficient in diameter and length to temporarily receive and hold the bayonet-style end connector 42 of a camera lens 40 as shown in FIG. 7. Adhesively attached to the bottom surface of the planar base 70 is a hook connector pad 80 configured to connect to the inside surface of a side panel 14, 16, a front panel 18, a rear panel 20, the bottom panel 22, or to the inside surface 32 of the lid 30. The panels 14, 16 18, 20, and 22 and the inside surface 32 of the lid 30 are made of cotton, nylon or felt material. The panels 14, 16 18, 20 or 22 may include a loop connector pad 24 commonly used with an adjustable partition configured to attach at its opposite ends to the opposite panels 14, 16, 18 and 20.

Figure 6:
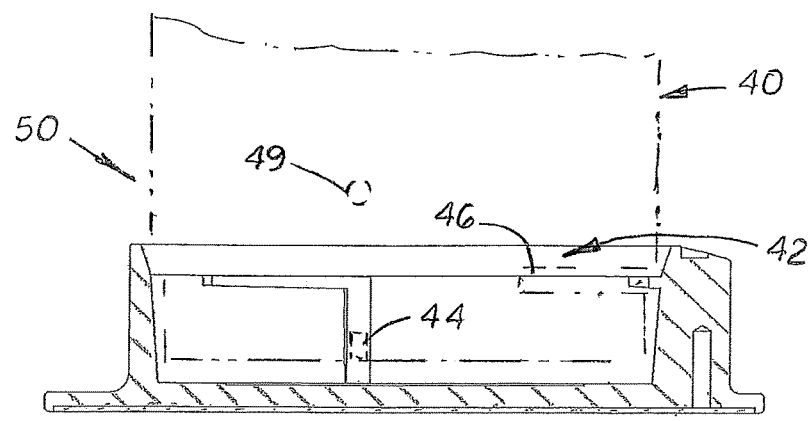
FIG. 6 is a sectional side elevational view of the lens holder as shown along line 6-6 in FIG. 3.

Formed on the inside surface cylindrical body's side walls 54 are inward projecting lugs 58 configured to engage the lugs 44 and slots 46 formed on the bayonet-style end connector 42 of a lens 40 as shown in FIG. 6. Formed on the outside surface 62 of the cylindrical body 52 are two or more outward protruding wings 64. In one embodiment, the wings 64 are triangular in shape with their apexes 65 aligned opposite the entrance opening 59 of an inward projecting lug 58 formed on the cylindrical body 52. As shown in FIG. 6, most lens 40 include a raised or color dot 49 on the exterior surface of the lens 40. During use, the photographer can determine the properly aligned of the lugs 44 on the lens 40 over the lugs 58 on the lens holder 50 by feeling the apex 65 of at least one wing 64 and aligning the lens alignment dot 49 with the apex 65. The wings 64 also act as gripping surfaces for rotating and locking the lens 40 into the lens holder 50.

As shown in FIG. 4, in one embodiment, the top surface 66 of each wing 64 is beveled downward to accommodate a gasket 44 attached to the bayonet-style end connector 42 of a lens 40 when it is inserted into the holder 50. As shown in FIG. 6, the chamfered inside edge 57 of the cylindrical body 52 is configured to allow the user to easily insert the bayonet-style end connector 42 without precisely aligning the lens 40 over the cavity 56.

As discussed above, many camera bags 10 are sold with loop connecting pads attached to their interior surfaces. The camera bags 10 are sold with flexible partitions with folding ends with complimentary hook pad connectors at its opposite ends that the user selectively attaches at different locations inside the sides of the camera bag 10 to create isolated small storage areas inside the camera bag. When the lens holder 50 is used with camera bags 10 with loop connecting surfaces, the hook connector pad 80 can be directly connected to a loop connecting surface. If the camera bag 10 does not have loop connecting surfaces, then loop connector pad 80 may be sewn or adhesively attached to the inside surface of the camera bag 10.

The lens holder 50 may be distributed with an optional adhesively backed loop connector pad 90 compatible with the hook connector pad 80 attached to the inside surface of the planar base 70. If the inside surface of the camera bag 10 does not have a loop connector pad surface compatible with the hook connector pad 80, the user may selectively attach the loop connector pad 90 to a camera bag surface.

Camera manufacturers sell lens specifically designed to be used with their camera bodies. Unfortunately, the diameter and protruding lugs on the bayonet-style end connector on lens used with cameras sold by different manufacturers varies. Also, the length of the lens 40 adjacent to the bayonet-style end connector 42 also varies with different lens manufacturers. The lens holder 50 may be specifically designed to be used with lens with a specific bayonet-style end connector.

For example, the lens holder 50 shown in FIGS. 2-7 is specifically designed to be use with SLR cameras sold by Canon USA, Inc. The outer diameter of the planar base 70 is 7.4 cm. The outer diameter of the cylindrical body 52 is between 4.5 to 5.8 cm and the inside diameter of the cylindrical body 52 is between 4.1 to 5.4 cm, respectively. The height of the sidewall 54 is approximately 0.7 to 1.4 cm.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

We claim:

1. A camera lens holder configured to hold a camera lens with a bayonet-style end connector formed on one end to different inside surfaces of a camera bag, the holder comprising:
   a. a cylindrical body and circular in cross-section with an inward chamfered top edge, a curved, thin sidewall with an outside surface and an inside surface that forms a cylindrical cavity coaxially aligned and inside the cylindrical body;
   b. at least two inward extending lugs formed on the inside surface of the sidewall on the cylindrical body and below the chamfered top edge, the lugs being sufficiently spaced apart and configured to engage a bayonet-style connector formed on a camera lens when the camera lens is longitudinally aligned and inserted into the cylindrical cavity;
   c. a circular planar base perpendicularly and coaxially aligned and affixed on one end of the cylindrical body and opposite the top edge, the planar base includes a flat lower surface;
   d. at least two outward extending wings located on the sidewall of the cylindrical body, the extending wings being spaced apart on the sidewall so that the cylindrical body may be held and prevented from rotating by gripping the wings when inserting and locking the camera lens into the lugs formed on the cylindrical body; and
   e. a hook connector pad attached to the lower surface on the planar base.

2. The holder, as recited in claim 1, further including an optional loop connector pad compatible with the hook connector pad attached to the planar base.

3. A camera lens holder configured to hold a camera lens with a bayonet-style end connector formed on one end to different inside surfaces of a camera bag, the holder comprising:
 a. a cylindrical body circular in cross-section with an inward chamfered top edge, a curved, thin sidewall with an outer surface and an inside surface that forms a cylindrical cavity coaxially aligned and inside the cylindrical body;
 b. at least three inward extending lugs formed on the inside surface of the sidewall on the cylindrical body, the lugs being sufficiently spaced apart and configured to engage bayonet-style connectors formed on a camera lens when inserted into the cylindrical cavity;
 c. a circular planar base perpendicularly and coaxially aligned on one end of the cylindrical body and opposite the top edge, the planar base has a diameter greater than the cylindrical body and includes a lower surface;
 d. a hook connector pad attached to the lower surface on the planar base; and
 e. at least two wings extending outward from the outer surface and on opposite sides of the cylindrical body configured for gripping to prevent rotation of the cylindrical body when rotating and locking the camera lens into the lugs on the cylindrical body.

4. The holder, as recited in claim 3, wherein each wing has a beveled top surface.

5. A method of holding a bayonet-style end connector on a camera lens to different flat surfaces inside a camera bag, comprising the following steps:
 a. selecting a holder that includes;
  a cylindrical body circular in cross-section with an inward chamfered top edge, a curved sidewall with an inside surface that forms a cylindrical cavity that is coaxially aligned with the cylindrical body, the curved sidewall includes an outer surface;
  at least two inward extending lugs formed on the inside surface of the curved sidewall on the cylindrical body and below the inward chamfered top edge, the lugs being sufficiently spaced apart and configured to engage a bayonet-style end connector formed on a camera lens when inserted into the cylindrical cavity;
  a circular planar base perpendicularly and coaxially aligned on one end of the cylindrical body and opposite the top edge, the planar base has a diameter greater than the cylindrical body and includes a lower surface; and
  a hook connector pad attached to the lower surface on the planar base;
 b. selecting a camera bag with an interior flat surface configured to attach to the hook connector pad attached to the planar base;
 c. attaching the hook connector pad on the planar base to the interior surface of the camera bag; and
 d. coaxially aligning a camera lens over the top edge of the cylindrical body and inserting the camera lens into the cylindrical cavity formed on the cylindrical body until the bayonet-style end connector is aligned with the lugs formed on the cylindrical body; and
 e. gripping the cylindrical body with one hand and rotating the camera lens with a second hand so that the bayonet-style end connector engages the lugs on the cylindrical body.

* * * * *